Dec. 10, 1968  D. W. BERREMAN  3,415,588
LIGHT TRANSMISSION SYSTEM UTILIZING TRANSVERSE TEMPERATURE
GRADIENTS IN A TRANSPARENT GAS
Filed Feb. 25, 1964  3 Sheets-Sheet 1
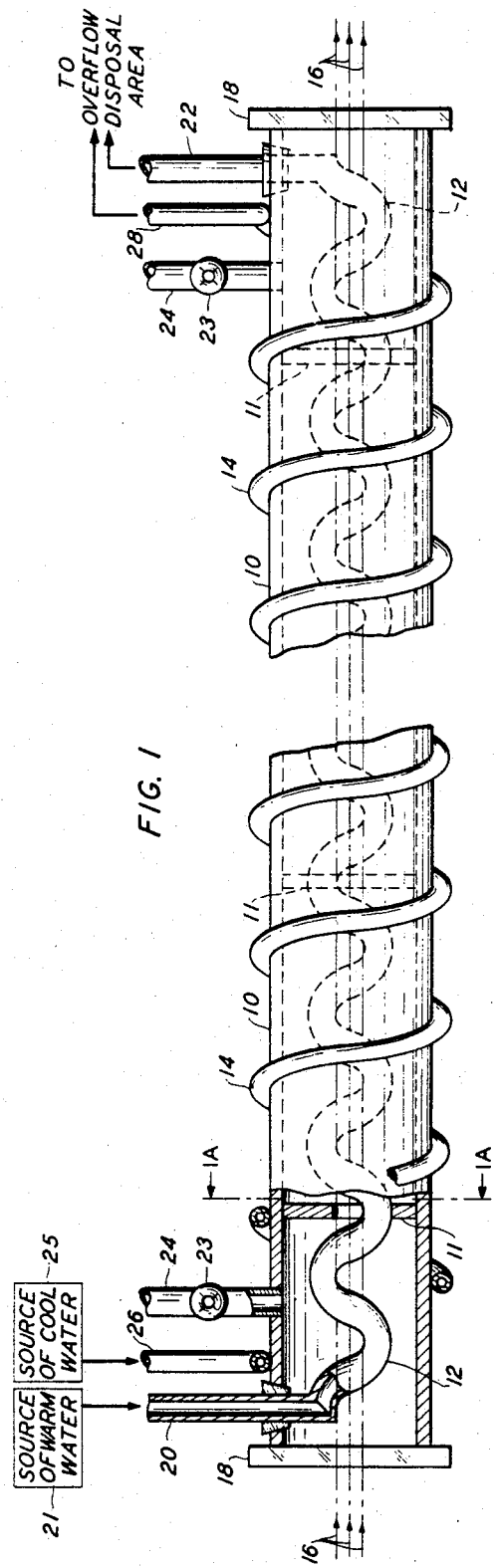
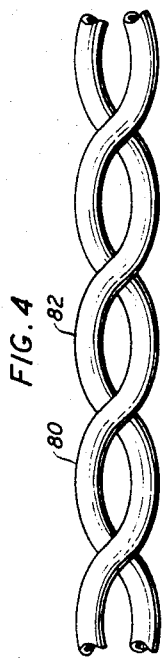
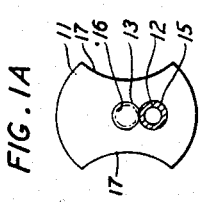
INVENTOR
D. W. BERREMAN
BY
H. O. Wright
ATTORNEY

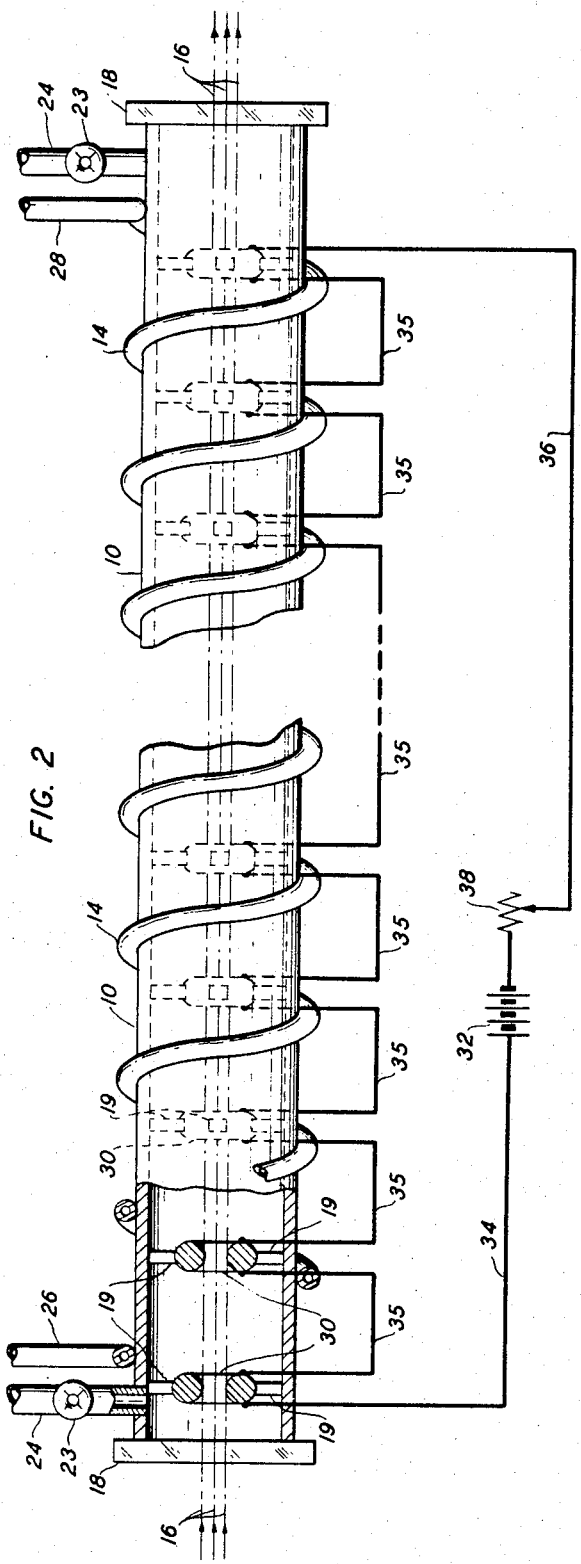

United States Patent Office 3,415,588
Patented Dec. 10, 1968

3,415,588
LIGHT TRANSMISSION SYSTEM UTILIZING
TRANSVERSE TEMPERATURE GRADIENTS
IN A TRANSPARENT GAS
Dwight W. Berreman, Westfield, N.J., assignor to Bell
Telephone Laboratories Incorporated, New York, N.Y.,
a corporation of New York
Filed Feb. 25, 1964, Ser. No. 347,166
10 Claims. (Cl. 350—96)

ABSTRACT OF THE DISCLOSURE

This application describes a waveguiding structure for electromagnetic wave energy and, in particular, for light beams. It is disclosed that by establishing a radially decreasing temperature gradient in a transparent gas, rays, which tend to diverge away from the beam axis, are refracted back towards the axis in much the same way as they would be by a thin converging lens. In accordance with one embodiment of the invention the gradients are distributed longitudinally along the wavepath and vary continuously in their transverse direction. In a second embodiment, thermal gradients are discretely spaced along the wavepath. Arrangements for negotiating curves are also described.

---

This invention relates to the long distance transmission of electromagnetic waves. More particularly, it relates to the long distance transmission of beams of ultrahigh frequency wave energy, including visible light and adjacent energy bands, and to the prevention of scattering of the rays of such beams during transmission.

Many arrangements for generating and utilizing extremely narrow, intense and highly directive beams of substantially coherent, very high frequency, electromagnetic wave energy, principally in the visible light and adjacent energy bands, embracing wavelengths between the approximate limits of 1000 Angstroms and two million Angstroms, inclusive, have been devised during the last several years. Numerous and varied devices for generating such wave energy beams, usually designated "lasers," have been and are being invented and developed with astonishing proliferation.

In view of the extremely high frequencies of such waves and the wide frequency range over which they are operative, the above developments give promise of the practicability of utilizing vastly extended ranges of frequency for systems of extremely large capabilities for the transmission of intelligence such as speech, video, and data transmission signals and the like.

Notwithstanding the fact that lasers devised during the last few years are capable of producing extremely narrow, highly directive, substantially coherent energy beams, transmission of even these beams over substantial distances is accompanied by a very appreciable spreading of the beam, resulting in a large diminution of the energy received, usually referred to as attenuation, at a distant point on the axis of the beam. Beam spreading also involves the possibility that a significant portion of the energy beam may be intercepted by other stations as well as by the intended receiving station.

Furthermore, in many instances it is desired that the laser beam be transmitted through an enclosing pipe or conduit, of a material impervious to gas. A gas or mixture of gases can then be employed to fill the conduit thus providing a medium of controllable uniform and stable characteristics, so that the transmission can be rendered free from unfavorable effects such as those resulting from changing atmospheric conditions such as rain, snow, sleet, fog, temperature effects and the like. Such a system, obviously, would, if the pipe or conduit is also opaque to light, eliminate all possibility of interception of portions of the beam by unauthorized receiving stations, thus assuring the preservation of complete privacy of communication.

The above-mentioned spreading of the beam when an enclosing conduit (which must necessarily have transverse cross-sectional dimensions much larger than the wavelength of the light or similar energy to be transmitted) is employed obviously may result, for a long distance system (several hundred miles long, for example) in the multiple reflection of the spreading rays by the conduit walls, destroying the coherency of the beam and producing serious attenuation and distortion of the transmitted signals. Thus it is apparent that the use of means for substantially eliminating beam spreading is important even when an enclosing conduit is employed.

The present invention proposes to reduce to substantial elimination the above described deleterious effects of beam spreading by introducing throughout the length of the beam path a slight diversion of the outer rays of the beam toward the central axis of the path.

The use of thin solid lenses of glass or the like distributed along the path for such a purpose has not proven very satisfactory both because of the substantial attenuation introduced by even the best of such lenses, in view of the large number of lenses required, and because of reflection effects at the surfaces of the lenses.

Accordingly, it is proposed in accordance with the present invention to introduce moderate temperature gradients transversely to the path traversed by the energy beam, the gradients being distributed along the path and varied in their transverse angular directions in such manner that rays which tend to diverge from the axis of the beam are repeatedly deflected toward the axis in much the same way as they would be were a plurality of thin, long focal length, solid lenses introduced at appropriate intervals along the axis of the beam. The resultant collimating effect can then be proportioned to substantially eliminate the deleterious effects otherwise introduced by the tendency of the beam to spread.

Accordingly, a principal object of the invention is to eliminate the difficulties resulting from beam spreading in beam transmission systems.

Other and further objects, features and advantages of the application of the principles of the present invention will become apparent from a perusal of the following detailed description of illustrative embodiments of said principles and the appended claims taken in conjunction with the accompanying drawing, in which:

FIG. 1 illustrates, in diagrammatic form, a first structure utilizing the principles of the present invention;

FIG. 1A illustrates in detail a supporting washer for the internal helix of FIG. 1;

FIG. 2 illustrates, in diagrammatic form, a second structure utilizing the principles of the present invention;

FIG. 4 illustrates an arrangement of two intertwined helices which offers some advantages over the use of a single helix as the internal heating member.

Figure 3:
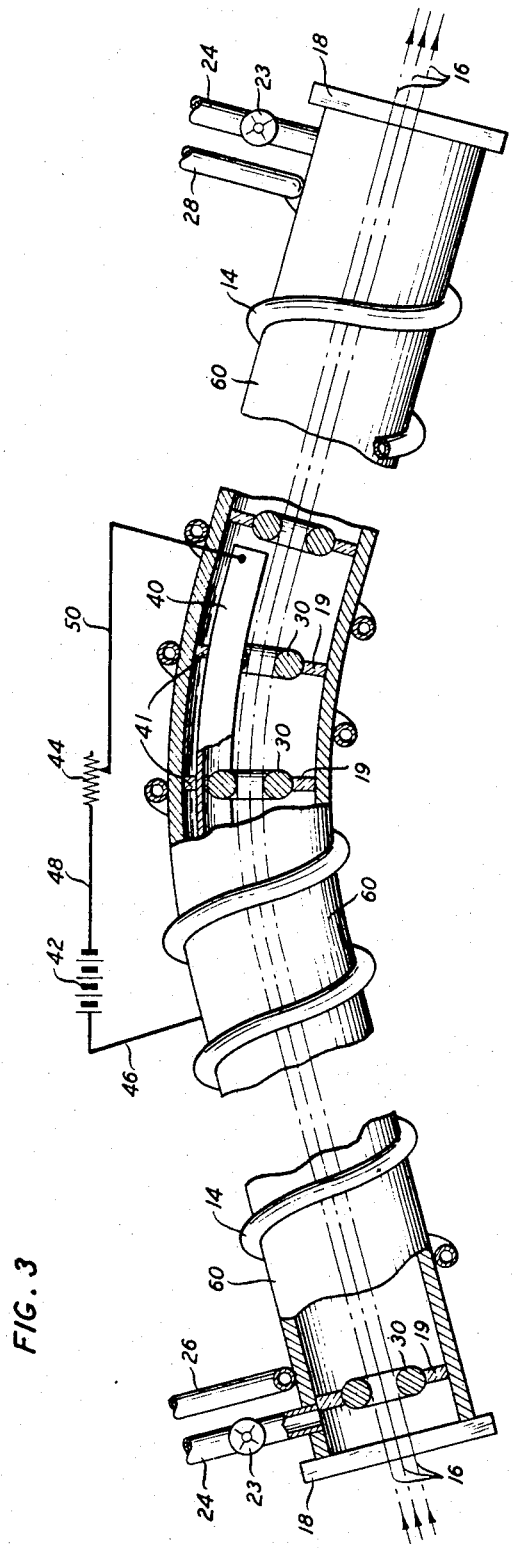
FIG. 3 illustrates in diagrammatic form a modified structure of the invention for conveying light and similar energy beams around a bend so that they may be directed toward a receiving station not on the original axis of the beam.

Identical structural features appearing in two or more of the figures of the drawing will be given corresponding designation numbers, respectively, and each feature will be described in detail in connection with the structure of the first figure in which it appears.

In more detail, in FIG. 1 a length of a pipe or conduit 10, which may, for example, extend between cities several hundreds of miles apart (the break near the center of the figure is intended to indicate a length too great to permit of realistic illustration), is of a material impervious to gas and a sufficiently good heat conductor that no sharp temperature gradients are established therein. Suitable materials are, for example, numerous plastics and metals including copper, aluminum, steel or the like. The conduit 10 is preferably employed to enclose the path 16 along which it is proposed to project a laser beam if, as mentioned above, the path of the beam would otherwise be subject to atmospheric changes such as rain, snow, sleet, fog, dust or the like. As is also mentioned above, if, furthermore, privacy is important, the material chosen for conduit 10 is preferably opaque to energy of the above-mentioned light and adjacent frequency bands. Conduit 10 may be of circular, square, oval, triangular, rectangular or other transverse cross-sectional shape so long as it serves to adequately enclose the helix 12 and path 16 along which the energy beam is to be transmitted. Normally it will be found preferable to employ corresponding transverse cross-sectional shapes for the conduit beam path and heating members.

A first helix 12 of tubing having a pitch (that is, a distance between similar points of successive turns of the helix) of, for example, approximately one inch and an input end 20 and an output end 22 is enclosed within conduit 10 and is coiled so as to surround the outer surface of the path 16 along which it is proposed to transmit the laser or similar beam. The transverse cross-sectional shape of path 16 may be circular, oval, square, or of other convenient form. The tubing of helix 12 may be of any of the materials mentioned above for the conduit 10. The pitch of the helix should be at least equal to the largest transverse cross-sectional dimension of the beam path as otherwise it may prove impracticable to maintain temperature gradients of significant magnitude across the path of the beam.

Supporting members 11 of low heat conductance placed at suitable intervals along conduit 10 hold helix 12 in proper alignment in conduit 10.

A suitable form for member 11 is illustrated in FIG. 1A, assuming conduit 10 is of circular transverse cross section. A hole 15 surrounds and tightly fits over approximately three quarters of the transverse periphery of the helical tubing 12 leaving the more central quarter of the tubing 12 uncovered. A hole 13, centrally located, provides an opening for the beam path 16 and cutout portions 17 at its sides together with hole 13 permit the ready passage of gas along the interior of conduit 10. In many instances it may not be necessary to provide the cutout portions 17.

A second helix 14 which may also be of any of the above-mentioned materials has an input end 26 and an output end 28 and is coiled around the outer surface of conduit 10 in intimate contact with conduit 10.

For a system many miles in length, a plurality of helices 12 and 14 of convenient individual lengths placed end to end with their respective input and output ends brought out at convenient intermediate maintenance stations would, of course, prove more practicable. Appropriate arrangements of this character can of course readily be devised by mechanics skilled in the arts involved.

Thin plate glass barriers 18 of the highest grade optical glass are preferably provided at each end of conduit 10 and gas ports 24, equipped with valves 23, are provided near each end, and at such intermediate points as may be deemed advisable, the purpose of these features being to permit the maintenance of a substantially ideal atmosphere within conduit 10, as will become apparent as the description proceeds.

In operation, the inner helix 12 is heated, as by passing warm water or other convenient heating fluid through it from a source 21 to a temperature a few degrees (for example, eight degrees) centigrade higher than the "usual temperature" of conduit 10.

Similarly, the conduit 10 is maintained at its "usual temperature" by passing cool water or other convenient cooling fluid of suitable temperature and volume from a source 25 through the outer helix 14 to maintain the temperature difference it is desired to establish between helix 12 and conduit 10.

Output ends 22 and 28 of helices 12 and 14, respectively, should, of course, be connected to a suitable disposal area. Alternatively, the overflow may be recovered, appropriately reconditioned, and reused, one practicable arrangement being to reverse the flow through the respective helices periodically after appropriate quantities have been reconditioned at the respective outputs.

Alternatively, inner helix 12 can, obviously, be heated appropriately by passing electrical current through a suitable resistance wire (not shown) housed within helix 12 or substituted for helix 12.

The conduit 10, for example, in accordance with common practice for communication conduits, preferably may be filled with dry air or any appropriate substantially inert dry gas or mixture of such dry gases at a pressure at least slightly above atmospheric pressure to prevent leakage from the surrounding atmosphere into the conduit. The gas carbon dioxide is, for example, sometimes employed in devices of the invention since its refractive index is somewhat greater than that of most gases. The maintenance of a controlled substantially ideal and unchanging atmosphere within conduit 10 eliminates any necessity of readjusting the parameters of the system, such as, for example, the temperatures of helix 12 and conduit 10, to compensate for external atmospheric changes in pressure, temperature, humidity or possible contamination by smoke, dust or the like, as might be necessary were air from the surrounding atmosphere freely permitted to enter and fill the conduit.

As the gas adjacent points on the surface of inner helix 12 will be heated, its density will be decreased at such points and will consequently tend to deflect rays of the laser beam passing close to helix 12 toward the axis of the laser beam. Convection currents established in the gas adjacent the helix are believed to enhance the focusing or deflecting effect of the overall system. The overall effect of the arrangement of FIG. 1 when appropriately proportioned and adjusted, as will be discussed at greater length hereinunder, is, therefore, to minimize the scattering of rays of the energy beam and to confine them to their intended path 16 through the center of the conduit.

The plate glass barriers 18, which should be as thin as practicable, in view of the pressure and normal stresses incident to use, and of the highest grade optical glass with surfaces accurately plane and parallel, are located at each end of conduit 10 and serve, as noted above, to confine in the conduit the particular gas or gases selected for filling conduit 10. Turbulence of the gas should be kept to a minimum. For example, additional gas as may be required to maintain the selected operating pressure should be introduced slowly, moderate temperature differences as between the helix 12 and conduit 10 should be employed, and major flushing operations if required should be effected during periods when the system is not being used to transmit signals.

A gas port 24, provided with a valve 23, is provided at each end and at convenient intermediate points of a long system so that the conduit may be initially, and at such intervals as may be found advantageous, flushed to remove unwanted gases and the conduit may then be filled with the selected gas or gases and maintained at a preselected pressure which, as mentioned above, is usually at least sufficiently above atmospheric pressure that leakage into the conduit is not probable. The use of a somewhat further increased pressure will have the effect of increasing the "lens" or focusing strength. Arrangements for flushing, filling, and maintaining pressure in gas filled communication conduits being well known and extensively used in the art are not shown or described in detail in this application.

In a number of cases the cooling helix 14 on the outer surface of the conduit 10 may not be required as, for example, where the conduit is immersed in a large body of water (that is, as for a submarine cable) or where the conduit is buried at a sufficient depth in the ground to be kept at a substantially constant temperature determined by the ground temperature. Alternatively, adequate cooling may in some instances be afforded by the surrounding atmosphere particularly if cooling fins (not shown) are provided on the exterior of the conduit. In rare instances, where ambient conditions are substantially constant, it may indeed be possible to dispense with the use of conduit 10, entirely, as for example, in large buildings having extensive ducts and passages which are only partially occupied by heating and power service lines and the like.

In other cases as, for example, where portions of the conduit may at times be exposed to intense direct sunlight or may pass closely adjacent to hot steam pipes or the like, it may be necessary to provide ample heat insulation over such exposed portions of the conduit assembly so that a substantially uniform conduit temperature over its entire length and periphery can be readily maintained.

Heat loss from the inner helix 12 to the conduit 10 can obviously be reduced by increasing the diameter of conduit 10 to provide greater separation from the helix 12.

The focusing effect of the arrangement of FIG. 1 will in general be approximately proportional to the length of tubing of helix 12 per unit length of conduit 10 and the temperature difference between helix 12 and conduit 10.

In FIG. 2 an arrangement is shown which is similar to that of FIG. 1, except that the inner helix 12 of FIG. 1 is omitted and spaced ring-shaped electrical heating units 30 are substituted. The units 30 are aligned along the longitudinal axis of conduit 10 and the central holes of the units 30 accommodate the passage of the laser or like beam along path 16. The holes in units 30 should, for best results, have transverse cross-sectional shapes substantially the same as the transverse cross-sectional shape of path 16 along which the energy beam is to be transmitted. The heating units 30 may be, for example, connected electrically in series as by electrical conductors 34, 35 and 36 and supplied by power from electrical energy source 32 through rheostat 38. Each unit 30 may be centrally maintained in conduit 10 by a plurality of small spacing elements 19 of a material having low heat conductivity.

Units 30 of FIG. 2 should be spaced along conduit 10 at intervals such that the sum of the circumferences of the rings substantially equals the length of tubing in the helix 12 of FIG. 1 for a comparable effect. The minimum spacing between units 30 should be substantially as described for the minimum pitch of the internal helix 12 of FIG. 1. The remaining features of the arrangement of FIG. 2 may be identical with the corresponding features of the arrangement of FIG. 1 as described in detail above in connection with FIG. 1 and as indicated by like designation numbers common to both figures. As for the system of FIG. 1, that of FIG. 2 may also be several hundreds of miles in length. Again, the break intermediate the ends of the system of FIG. 2 is intended to indicate a length too great to permit of realistic representation.

In FIG. 3 the essential features of an arrangement of the invention adapted to guide the beam of a laser (or an energy beam of visible light or of adjacent frequency regions) around a curved portion of a guiding conduit for an enclosed path beam transmission system are indicated.

As illustrated in FIG. 3, conduit 60 is curved to effect substantially a 45 degree change in direction. In practice a much longer radius of curvature than shown in the drawing would normally be employed, for example, at least 100 meters, but it is obviously not conveniently practicable to illustrate such a long radius in a patent drawing.

The arrangement of FIG. 3 differs from the previously disclosed arrangements in that an additional heating unit 40 is inserted within the conduit 60 along the curved portion of the conduit closely adjacent the coils 30 on the upper or outer side of the curved portions, as shown. Appropriate supporting members 41 of low heat conductivity material support heating unit 40 within conduit 60.

Inside conduit 60 spaced electrical heating coils 30 substantially as employed in FIG. 2 are provided, as shown. Alternatively, a heating means of helical form could be employed substantially as described in connection with FIG. 1, or intertwined helices as described in connection with FIG. 4, hereinunder, could be employed.

A source of electrical power 42 is connected through rheostat 44 and electrical leads 46, 48 and 50 to heating unit 40.

By heating the outer side of the area adjacent coils 30 throughout the curved portion of conduit 60, the gas within that portion of conduit 60 is rendered less dense and the rays of the beam are turned in the direction of the curve. This effect combined with that of the spaced heating coils 30 is then adjusted to cause the laser or light beam to follow the curvature of the axis of conduit 60.

The system of FIG. 3, as for those of FIGS. 1 and 2, may also be several hundreds of miles in length.

In FIG. 4 a further refinement of the arrangement of FIG. 1 is illustrated and comprises the use of two substantially identical intertwined heating helices 80 and 82 extending the length of conduit 10 which are to constitute a substitution for the single helix 12 of FIG. 1. As shown, helices 80 and 82 are displaced longitudinally with respect to each other by one half of their common pitch.

The pitch of each of the helices 80, 82 of FIG. 4 is made substantially twice that of the single helix 12 of FIG. 1 for comparable focusing effect. Each helix 80, 82 surrounds the beam path 16 in substantially the same way as does helix 12 of FIG. 1.

The refinement is suggested as a means of eliminating a tendency (found in the use of a single helix as illustrated in FIG. 1) toward a spiraling of the beam rays reflected back toward the axis of the beam. Thus minor aberrations in the transmitted beam associated with the spiraling phenomenon are also eliminated. Other features associated with a system employing the intertwined helices 80, 82 of FIG. 4 may be substantially as shown in FIG. 1 and described in detail above.

Numerous and varied modifications and rearrangements of the above described illustrative embodiments can readily be made by those skilled in the art without departing from the spirit and scope of the principles of the invention. Accordingly, it is to be understood that the specific structures described are illustrative but in no way restrictive of the scope of the invention.

What is claimed is:

1. A waveguide for electromagnetic wave energy comprising:
   an elongated gas-filled conduit having transverse cross-sectional dimensions many times greater than the wavelength of the wave energy to be guided therein;
   said gas being transparent to said wave energy;
   heating means longitudinally distributed within said conduit in a manner to periodically encircle a portion of the space enclosed by said conduit;
   said heating means locally raising the temperature of the gas in the region adjacent thereto, thereby producing and maintaining a temperature gradient of significant magnitude in a direction normal to the conduit axis to guide said wave energy;
   and means associated with said waveguide for directing wave energy into said enclosed portion of said conduit for propagation longitudinally therealong.

2. The combination of claim 1 in which the heating means includes a helical member extending along the conduit.

3. The combination of claim 1 in which the heating means includes a pair of intertwined helical members extending along the conduit.

4. The combination of claim 1 in which the heating means includes a plurality of ring members spaced at intervals along the conduit.

5. The combination of claim 1 including means for maintaining the temperature of the conduit below the temperature of the heating means.

6. The combination of claim 1 including transparent means impervious to the passage of gas closing each end of the conduit.

7. The combination of claim 1 wherein said elongated conduit includes a curved section, and wherein additional heating means are included within said curved section for heating a restricted portion of the interior of said curved section of conduit.

8. A waveguide for electromagnetic wave energy comprising:
   an elongated gas-filled conduit having transverse cross-sectional dimensions many times greater than the wavelength of the wave energy to be guided therein;
   said gas being transparent to said wave energy;
   means longitudinally distributed within said conduit in a manner to periodically encircle a portion of the space enclosed by said conduit;
   means for establishing a temperature differential between said conduit and said encircling means, thereby producing a refractive index gradient in a direction normal to the axis of said conduit such that said wave energy is guided therealong in a direction essentially parallel to said axis;
   and means associated with said waveguide for directing wave energy into said enclosed portion of said conduit.

9. Apparatus for controlling the direction of propagation of a beam of light along a prescribed path comprising:
   an enclosure containing a light-transmissive gas;
   and means for producing and maintaining in said gas a plurality of longitudinally-spaced radially directed temperature gradients of significant magnitude extending across said path to control the direction of said beam of light.

10. Apparatus for controlling the direction of propagation of a beam of light along a prescribed path comprising:
    an enclosure containing a light-transmissive gas;
    and means located within said enclosure for producing and maintaining in said gas a continuum of radially directed temperature gradients of significant magnitude extending across said path to control the direction of said beam of light.

References Cited

UNITED STATES PATENTS

| | | | |
|---|---|---|---|
| 1,283,943 | 11/1918 | Sperry | 350—179 |
| 2,947,841 | 8/1960 | Pickles et al. | 343—704 X |
| 3,067,420 | 12/1962 | Jones et al. | 343—701 |
| 3,101,472 | 8/1963 | Goubau | 350—175 |
| 2,442,913 | 6/1948 | Abrams et al. | 350—253 |
| 2,575,020 | 11/1951 | Lee et al. | 350—253 X |

JOHN K. CORBIN, *Primary Examiner.*

U.S. Cl. X.R.

350—179